2 Sheets—Sheet 1.
R. W. JOHNSON.
Check-Rowing Attachment for Corn-Planters.
No. 225,986. Patented Mar. 30, 1880.
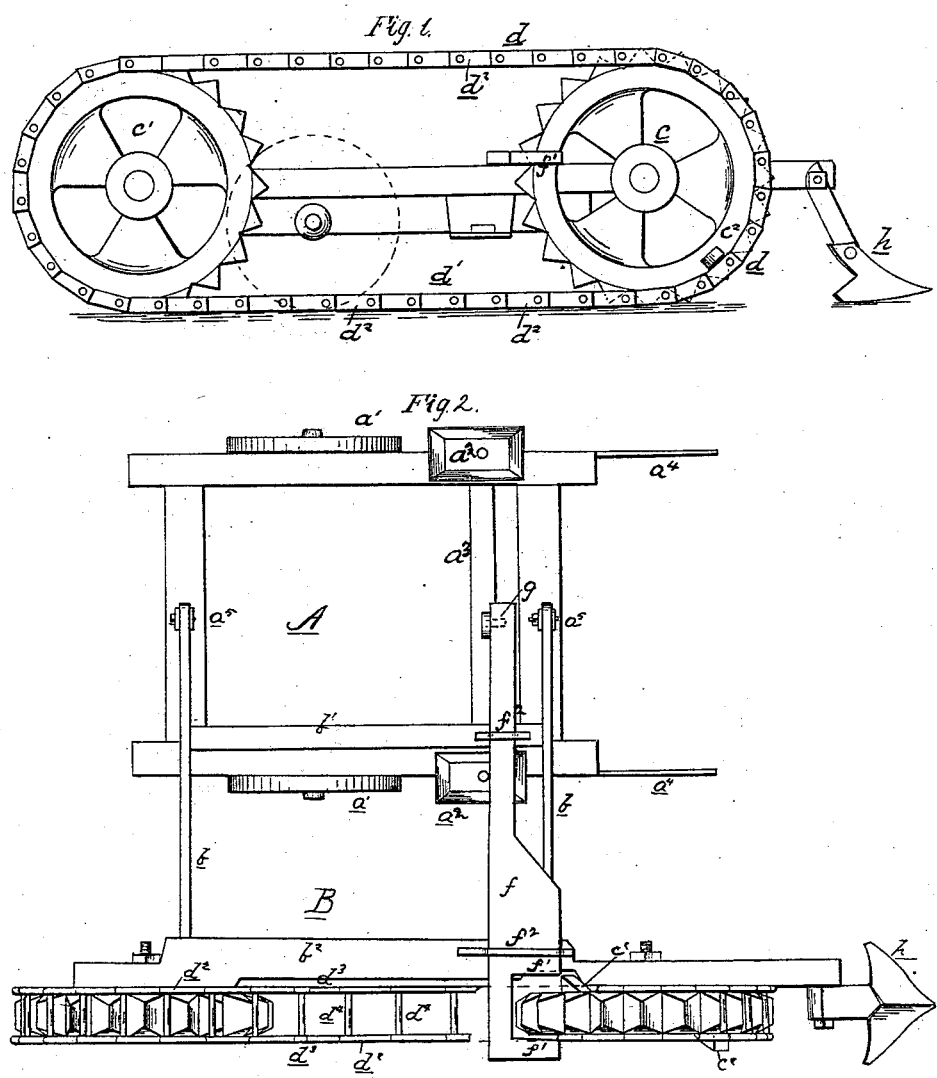
Attest:
F. D. Thomason
P. B. Durpiee
Inventor:
Roice W. Johnson
By R. S. & A. P. Lacey, attys.
N. PETERS, PHOTO-LITHOGRAPHER, WASHINGTON, D. C.

2 Sheets—Sheet 2.

R. W. JOHNSON.
Check-Rowing Attachment for Corn-Planters.

No. 225,986.  Patented Mar. 30, 1880.

WITNESSES
F. D. Thomason
P. B. Darpin

INVENTOR
Roice W. Johnson
By R. S. & A. P. Lacey
ATTORNEYS.

UNITED STATES PATENT OFFICE.

ROICE W. JOHNSON, OF FORT DODGE, IOWA.

CHECK-ROWING ATTACHMENT FOR CORN-PLANTERS.

SPECIFICATION forming part of Letters Patent No. 225,986, dated March 30, 1880.

Application filed February 16, 1880.

*To all whom it may concern:*

Be it known that I, ROICE W. JOHNSON, of Fort Dodge, in the county of Webster and State of Iowa, have invented certain new and useful Improvements in Corn-Planter Attachments; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to provide an apparatus to be attached to corn-planters for the purpose of operating the dropping mechanism, the said apparatus having an action independent of the wheels and other driving mechanism of the planter.

It consists in an endless track placed on the ground and so arranged that the driving-wheels run thereon, and in other mechanism, all of which will be hereinafter fully explained.

Figure 3:
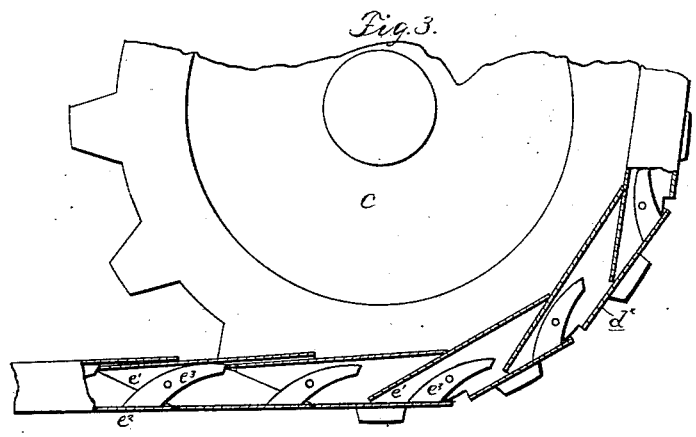
Figure 4:
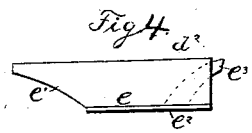
Figure 5:
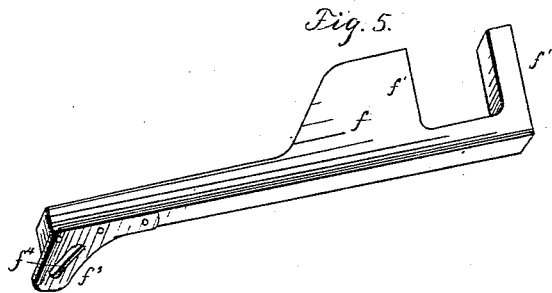

In the drawings, Figure 1 is a side elevation. Fig. 2 is a plan of a planter having my improvements attached thereto. Figs. 3, 4, and 5 are detail views.

A is the ordinary corn-planter frame, supported on wheels $a'\,a'$, and provided with the grain-boxes $a^2\,a^2$, the slide or dropping bar $a^3$, and runners $a^4\,a^4$.

B is the frame which supports the mechanism of my improvements. It is composed of the arms $b\,b$, the cross-bar $b'$, and the head-bar $b^2$, all of which are firmly framed together.

The ends of the arms $b$ are hinged at $a^5$ to the upper side of the cross-bars of the planter-frame in such manner that the frame B may have a vertical swinging movement to adapt it to any irregularities that may be in the surface of the ground.

The head-bar $b^2$ may be made of any desired length. I usually construct it slightly longer than the planter to which the apparatus is applied, so that the endless track hereinafter described and supported by it may be made long enough to have a power corresponding with the requirements of the dropping mechanism. The head-bar $b^2$ is arranged, as shown, parallel with the line of motion of the planter.

$c\,c'$ are two sprocket-wheels journaled in the front and rear of the head-bar $b^2$. Their peripheries rest on the ground, and by them the dropping mechanism of the planter is driven.

Around the wheels $c\,c'$, I place the endless track $d$, the under half, $d'$, of which lies on the ground and forms a fixed track or way over which the driving-wheels travel.

The track $d$ is made in small sections $d^2$, so that it will readily bend around the wheels $c\,c'$, and by preference is made in two parts, $d^3\,d^3$, united by short ties or bars $d^4$. Instead of being made thus, it may be made in a single track and carried around a grooved instead of a sprocket wheel.

The sections $d^2$ are formed so that when drawn into a straight line between the wheels they lock together and form a stiff bar or rail, which will not bend upward from, but will lie rigidly on, the ground. The peculiar construction and manner of being united are shown in Fig. 3.

Each section $d^2$ is composed of a hollow casing, $e$, one end of which is cut away, so as to provide a long hollow point, $e'$, open on its under side, which projects into the end of the next section. At the opposite end, and to the base-plate $e^2$, I fix a locking-arm, $e^3$, which extends upward and in the opposite direction from the point $e'$, and is arranged so that when the several sections are drawn in a straight line its top will touch the upper part of the section next following it, and the end of the point $e'$ of the second following section will rest against it, and thus lock and form a bar or track inflexible to upward pressure.

The track will bend readily around the wheels $c\,c'$, so that it is thus carried forward in the forward movement of the planter.

$f$ is a pitman constructed with two arms or shoulders, $f'\,f'$, which extend on opposite sides of the forward wheel, $c$. It is secured to the frame B by suitable straps $f^2\,f^2$, and is given a to-and-fro action by cams $c^2\,c^2$ on the wheel $c$ engaging the arms alternately. On the inner end of the bar $f$ is fixed a plate, $f^3$, having an inclined slot, $f^4$, which is placed on a pin, $g$, on a standard fixed on the dropping-bar $a^3$. The slot $f^4$ permits the necessary adjustment of the bar $f$ to the dropping-bar $a^3$ when the frame B is raised or lowered as the planter moves over uneven ground.

The operation of the device will be readily understood. Motion is imparted to the wheel *c* by its passage over the track *d*, the under part of which is fixed rigidly on the ground by the gravity of the machine on frame B. The track is, for the practical purposes to which it is applied, a rigid line or way fixed firmly on the ground. The wheel *c* receives its motion not by the movement of the track over its periphery, but by being drawn along on the top thereof.

By this invention greater uniformity in action is imparted to the dropping-bar $a^3$. The track will travel over all furrows and depressions in the surface of the ground, and will also cut slightly into the ridges, thereby measuring a correct line and distance.

Instead of a track constructed as described, a modification thereof may be substituted constructed of an endless belt having secured to its outer surface a series of rectangular blocks so attached that their ends will abut firmly together when the said belt is drawn straight; but I prefer to employ the belt hereinbefore specifically described, as it gives better results and is more durable.

*h* is a track-cleaner fixed to the front end of frame B immediately before the wheel *c*. It clears all rubbish and trash from the path of the track *d*.

What I claim as my invention is—

1. In a seeding-machine, the combination, with the bearing-wheels *c c'* and mechanism for operating the seeding devices, of the endless track *d*, carried by and forming a continuous track for said wheels, to which it imparts motion, substantially as described.

2. The combination, with the frame A and the dropping-bar $a^3$, of the frame B, hinged to the frame A, pitman *f*, the wheels *c c'*, journaled to the frame A, and endless track *d*, supported by the wheels *c c'*, so that as the planter is drawn forward it is laid on the ground and forms a track or way for said wheels to run upon, substantially as and for the purpose set forth.

3. The endless track *d*, composed of the hollow sections $d^2$, provided with the projecting ends *e'* and with the arms $e^3$, all constructed and hinged together as shown, substantially as and for the purpose set forth.

In testimony that I claim the foregoing as my own I affix my signature in presence of two witnesses.

ROICE W. JOHNSON.

Witnesses:
LEON VINCENT,
GEO. WOLFINGER.